Sept. 22, 1925.
J. R. DREHER
HARROW
Original Filed Feb. 11, 1922    2 Sheets-Sheet 2
1,554,422
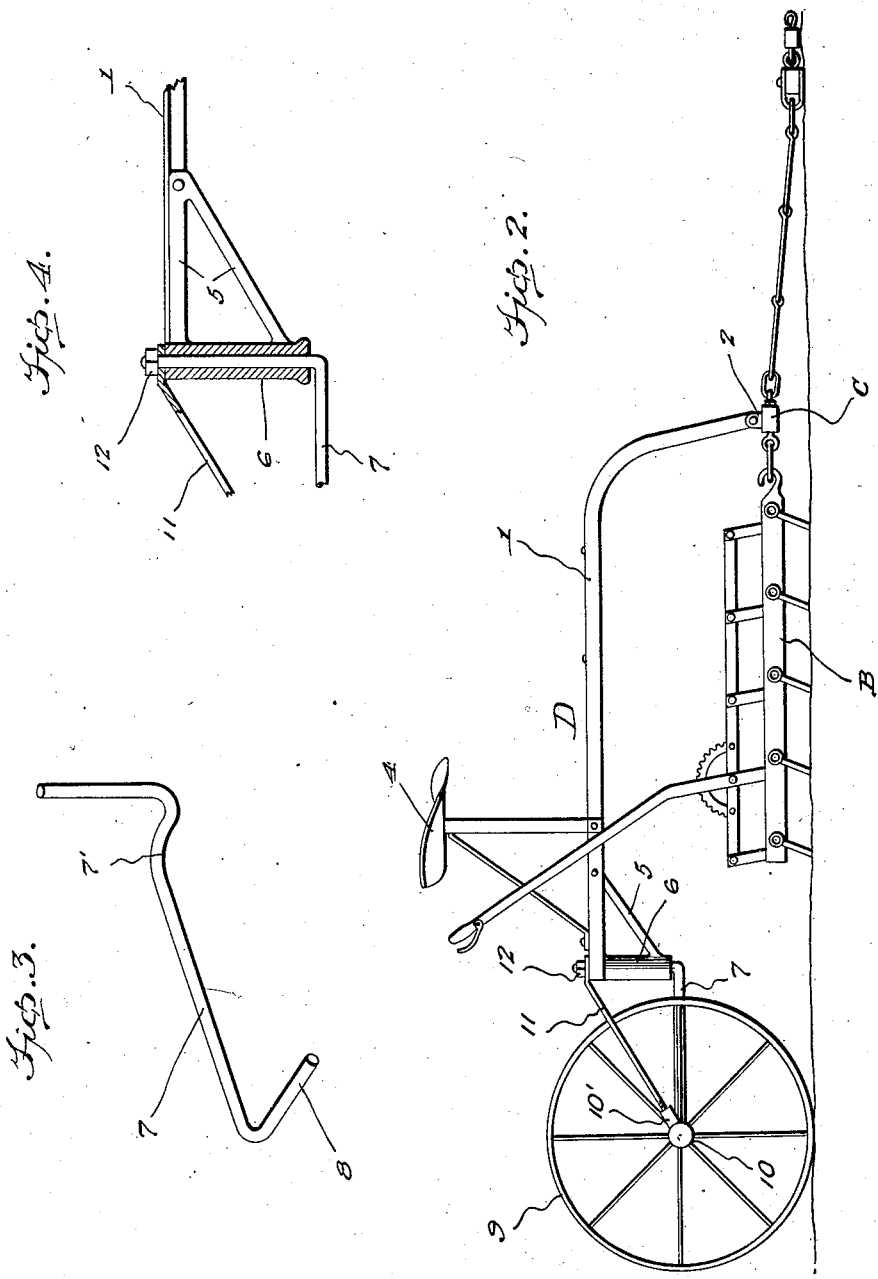
John R. Dreher, INVENTOR
BY *Victor J. Evans*
ATTORNEY
WITNESS:

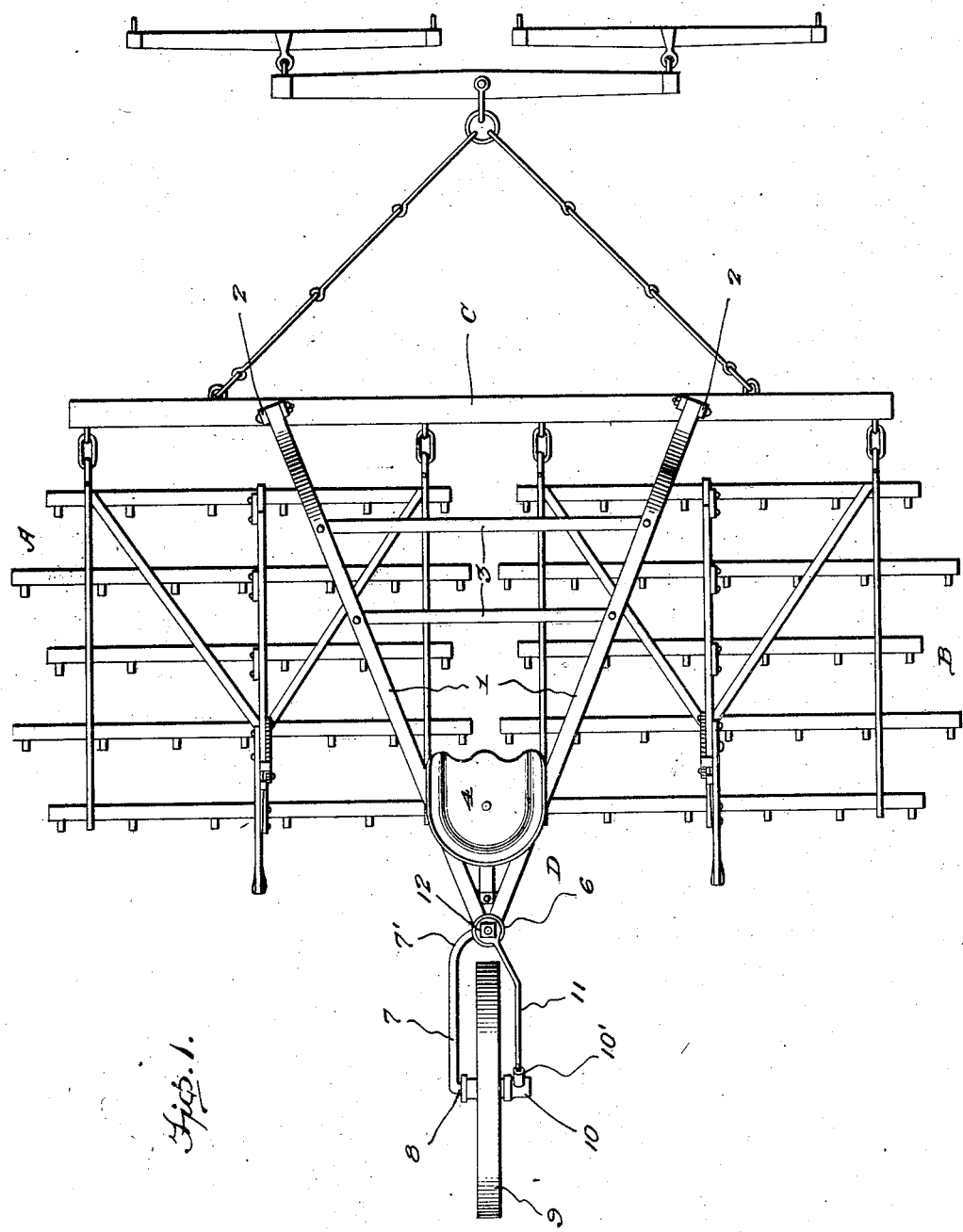

Patented Sept. 22, 1925.

1,554,422

UNITED STATES PATENT OFFICE.

JOHN R. DREHER, OF ALBERT LEA, MINNESOTA, ASSIGNOR TO GLOBE MACHINE & MANUFACTURING COMPANY, INC., OF ALBERT LEA, MINNESOTA.

HARROW.

Application filed February 11, 1922, Serial No. 535,870. Renewed June 8, 1925.

*To all whom it may concern:*

Be it known that I, JOHN R. DREHER, a citizen of the United States, residing at Albert Lea, in the county of Freeborn and State of Minnesota, have invented new and useful Improvements in Harrows, of which the following is a specification.

This invention relates to a harrow cart, the general object of the invention being to provide means for holding the harrow in the ground and to counter balance the lifting tendency of the draft of the horses.

Another object of the invention is to provide a wheel at the rear of the cart which is so connected with the cart that it can easily accommodate itself to turning movements of the harrow.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is a side view.

The remaining figures are detail views.

In these views A and B indicate a pair of sections of a harrow and C indicates the draw bar which is connected with the sections in the usual manner. My cart is indicated at D and consists of the converging side bars 1 having their front ends curving downwardly and attached to draw bar C by the clevises 2 to which the said ends are pivoted. Cross pieces 3 are connected with the side bars, as shown. The seat 4 is connected with the rear of the cart and a casting 5 is connected with the rear end of the cart and extends downwardly therefrom. This casting is formed with a vertical bearing 6 through which passes the vertical part of a shaft 7. This shaft is bent at right angles after passing from the bearing and is then curved, as at 7', so as to clear the wheel and said shaft has connected to its opposite end the spindle 8 for the wheel 9. This spindle may be formed integral with the shaft. A dust cap 10 engages the hub of the wheel and this cap has a screw threaded socket 10' in which fits the screw threaded end of a brace 11 which has an eye formed at its upper end for fitting over the upper end of the vertical part of the shaft 7, said upper end being screw threaded to receive the nut 12. Thus the shaft is rotatably mounted in the casting so that the wheel can swing in an arc and thus accommodate itself to the turning movement of the harrow and thus facilitate the turning of the harrow and the cart. The brace is adjustably connected with the hub cap and this brace will prevent the shaft from bending upwardly when weight is applied to the cart. The wheel will operate similar to a caster wheel and permit the harrow to be turned in a small circle.

The cart is very light and can be manufactured to sell at low cost, due to its simple construction and the fact that only one wheel is used. The seat is located almost in the center of the three points of suspension, thus making smooth riding and enabling the driver to see plainly as he is so situated that he is free of the dust raised by the harrow. It also places him close to the horses so that it is not necessary to use long lines.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A harrow cart comprising a frame, means for connecting the front end thereof with the draw bar of the harrow, a vertical bearing at the rear end of the cart, a shaft having a vertical part engaging said bearing and a rearwardly extending horizontal part, a spindle connected with the rear end of the horizontal part, a wheel rotatably mounted on the spindle and an adjustable brace rod connecting the hub of the wheel with the upper end of the vertical part of the shaft.

2. A harrow cart comprising a frame, means for connecting the front end thereof with the draw bar of a harrow, a vertical bearing at the rear end of said frame, a shaft having a vertical part pivoted in said bearing, and a rearwardly extending horizontal part, a laterally projecting spindle formed integral with the rear end of said horizontal part and a wheel revolubly mounted on said spindle.

In testimony whereof I affix my signature.

JOHN R. DREHER.